United States Patent [19]
Nakazawa et al.

[11] 3,779,645
[45] Dec. 18, 1973

[54] DISTANCE MEASURING DEVICE

[75] Inventors: Narihiko Nakazawa, Tokyo; Taiji Nakamura, Zushi; Teruyoshi Kitahara; Yoshio Habuka, both of Hayama-machi, all of Japan

[73] Assignee: Nippon Kogaku K.K., Tokyo, Japan

[22] Filed: May 13, 1971

[21] Appl. No.: 143,048

[30] Foreign Application Priority Data
May 20, 1970 Japan.................................. 45/43052
May 20, 1970 Japan.................................. 45/43055

[52] U.S. Cl......................... 356/5, 356/4, 250/204, 250/229
[51] Int. Cl............................................. G01c 3/08
[58] Field of Search .................... 356/4, 5; 250/229, 250/231, 204

[56] References Cited
UNITED STATES PATENTS
2,655,848  10/1953  Gray, Jr................................ 250/229
2,490,899  12/1949  Cohen.................................... 356/5
3,619,058  11/1971  Hewlett................................. 356/5
3,600,072  8/1971   Skagerlund........................... 356/5

*Primary Examiner*—Maynard R. Wilbur
*Assistant Examiner*—S. C. Buczinski
*Attorney*—Ward, McElhannon, Brooks & Fitzpatrick

[57] ABSTRACT

An improved distance measuring device of the type which utilizes an amplitude-modulated light wave to measure the phase difference between the transmitted and the received modulated wave and thereby determine the distance of an object, the device being characterized by a feedback path combined with the optical system of the device so that the difference in magnitude between a reception signal and a standard signal or a reference signal may be zero or within a predetermined range, whereby the phase difference between the two signals can be measured independently of the non-linearity of the circuits and thus highly accurate measurement of the phase difference and accordingly of the distance of the object can be attained.

8 Claims, 6 Drawing Figures

3,779,645

DISTANCE MEASURING DEVICE

BACKGROUND OF THE INVENTION

1. Field of the Invention

This invention relates to a distance measuring device, and more particularly to improvements in a distance measuring device of the type which utilizes an amplitude-modulated light wave to measure the phase difference between the transmitted and the received modulated wave and thereby determine the distance of an object.

2. Description of the Prior Art

The well-known system for measuring a distance by the utilization of light wave is classified into two types. In one of these types, a light wave modulated into a pulse form is transmitted from a source to an object in order to measure the time interval until the transmitted light wave returns to the source after reflected by the object. In the other type, use is made of a continuous modulated light wave to achieve a measurement in accordance with the phase difference between the transmitted and the received modulated wave.

The system of the latter type, to which the present invention relates, is further divided into the following two subtypes:

1. A light wave modulated by a modulator is transmitted to irradiate an object to be measured and a reflected wave resulting therefrom is converted into an electrical signal (reception signal) by a receiver. Such reception signal and a standard signal derived from said modulator are directed through amplifiers and waveform shaping circuits to a phase meter, which measures the phase difference between the two signals and thereby determine the distance of the object.

2. A phase difference $\phi_A$ is obtained between a reception signal and a standard signal in the same way as described just above, and a phase difference $\phi_B$ is obtained between the standard signal and a reference signal derived by passing the transmitted wave to the receiver via a predetermined path. Then the difference between these two phase differences $\phi_A$ and $\phi_B$ is obtained to determine the distance of the object.

According to these conventional methods, however, the quantity of light entering the receiver is decreased as the distance of the object is increased. Because the magnitude of the reception signal is varied with the distance to be measured, the non-linear characteristic of the amplifiers and waveform shaping circuits cause a variation in the phase of the input and output signal thereof. Therefore, even if two signals, i.e. reception signal and standard signal for the system of item 1) or reception signal and reference signal for the system of item 2), are passed through identical amplifiers and identical waveform shaping circuits, the accuracy of the phase difference measurement could not be enhanced because the phase difference between the two signals is affected by the magnitude of the reception signal.

SUMMARY OF THE INVENTION

A general object of the present invention is to provide a distance measuring device whose accuracy is enhanced by increasing the accuracy of the phase difference measurement.

A specific object of the present invention is to provide a distance measuring device which includes a feedback path combined with the optical system of the device so that the difference in magnitude between a reception signal and one of a standard signal or a reference signal may be zero or within a predetermined range, whereby the phase difference between the two signals can be measured without being affected by the non-linear characteristic of the circuits.

A better understanding of the present invention may be obtained by reading the following comparative description of the prior art devices and some embodiments of the present invention in conjunction with the accompanying drawings.

BREIF DESCRIPTION OF THE DRAWINGS

DESCRIPTION OF THE PREFERRED EMBODIMENTS

Figure 1:
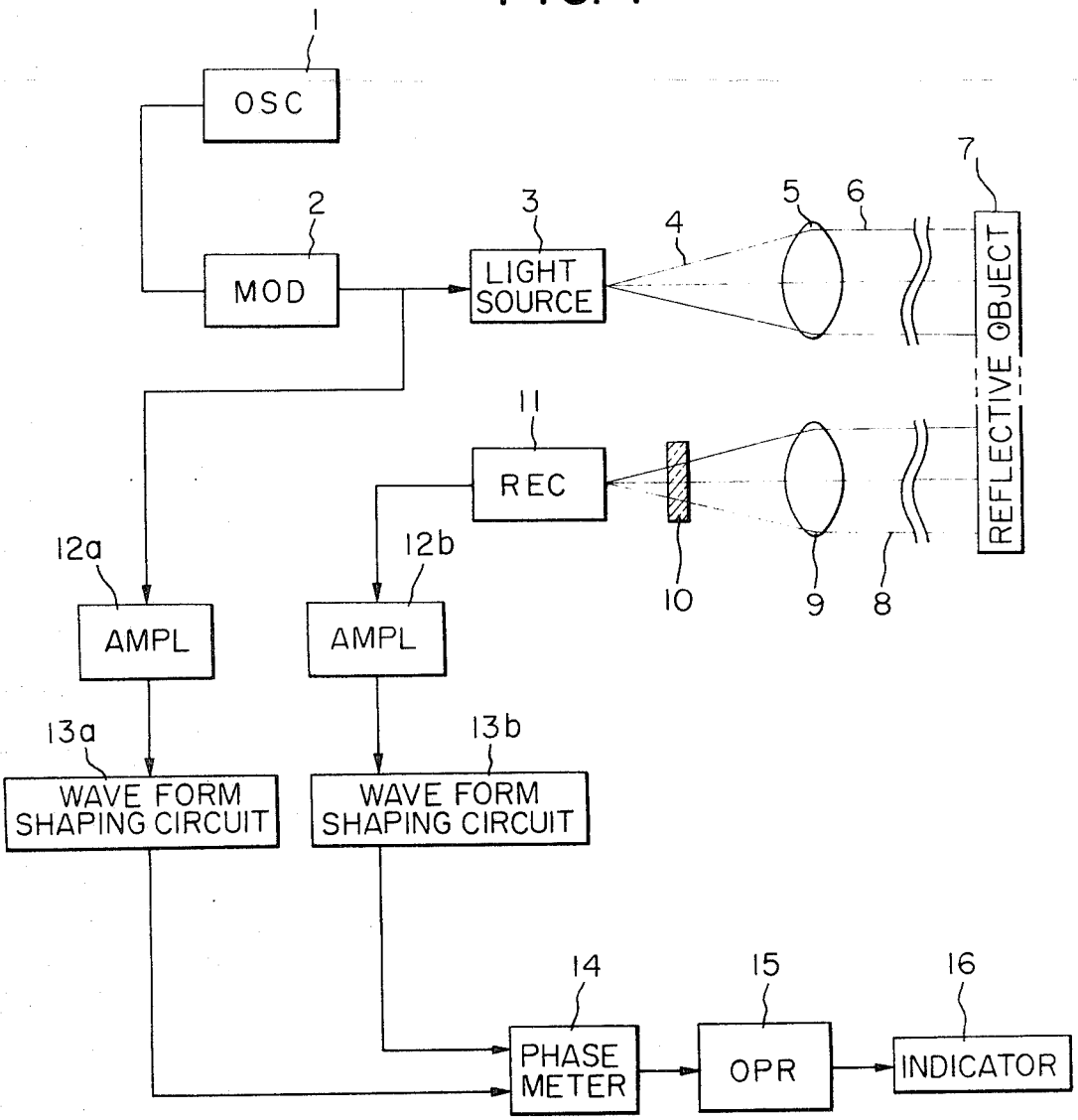
FIG. 1 is a schematic diagram of a distance measuring device according to the prior art.

Referring to FIG. 1 of the drawings throughout which the same reference characters are used to designate like parts, an oscillator 1 is provided to determine the modulation frequency. The output of the oscillator 1 is applied as input to a modulator 2 for modulating light from a light source 3, which comprises a luminous diode or a semiconductor laser. The modulator 2 may be either of the type which modulates the power for the light source 3 or of the type such as Kerrcell which modulates the quantity of light in the optical path. The output light from the light source 3 is modulated in amplitude or in revolution of polarization plane by the modulator 2. Light 4 from the light source modulated by the modulator 2 passes through an optical transmission system 5 and impinges as transmitted light 6 upon a reflective object 7 to be measured. The reflective object 7 may be a corner reflector or a cat's eye depending on such factors as the wavelength and the intensity of the light 4 from the light source 3, whereas it may be an object of any type when the light 4 has a sufficient intensity.

An optical reception system 9 is arranged with its optic axis disposed parallel to the optic axis of the optical transmission system 5 and it condenses light 8 reflected by the reflective object 7. The light thus condensed passes through a filter 10 for removal of any noise component present in such light, and thereafter enters a receiver 11 comprising a photodiode or the like, which converts the received light into an electrical signal (reception signal). Two identical amplifiers 12a and 12b are provided, one of which 12a receives a component divided from the output signal of the modulator 2 and the other amplifier 12b receives the reception signal which is the output signal of the receiver 11. Two waveform shaping circuits 13a and 13b, which are also identical with each other, are connected with the amplifiers 12a and 12b respectively. The outputs of the two waveform shaping circuits 13a and 13b are both connected with the input of a phase meter 14, whose output is connected to an operating circuit 15 and further to an indicator 16. Thus, the phase meter 14 measures the phase difference between a standard signal passing thereinto from modulator 2 through amplifier 12a and waveform shaping circuit 13a and a reception signal passing thereinto from receiver 11 through amplifier 12b and waveform shaping circuit 13b, and the phase difference thus measured is converted by the operating circuit 15 into the distance between the light source 3 and the object 7 and displayed by the indicator 16.

In such a conventional device, however, the magnitude of the reception signal varies according to the distance to be measured and as described previously, this results in a reduced accuracy of the measured phase difference due to the non-linear characteristic of the amplifiers 12a, 12b and waveform shaping circuits 13a, 13b.

Figure 2:
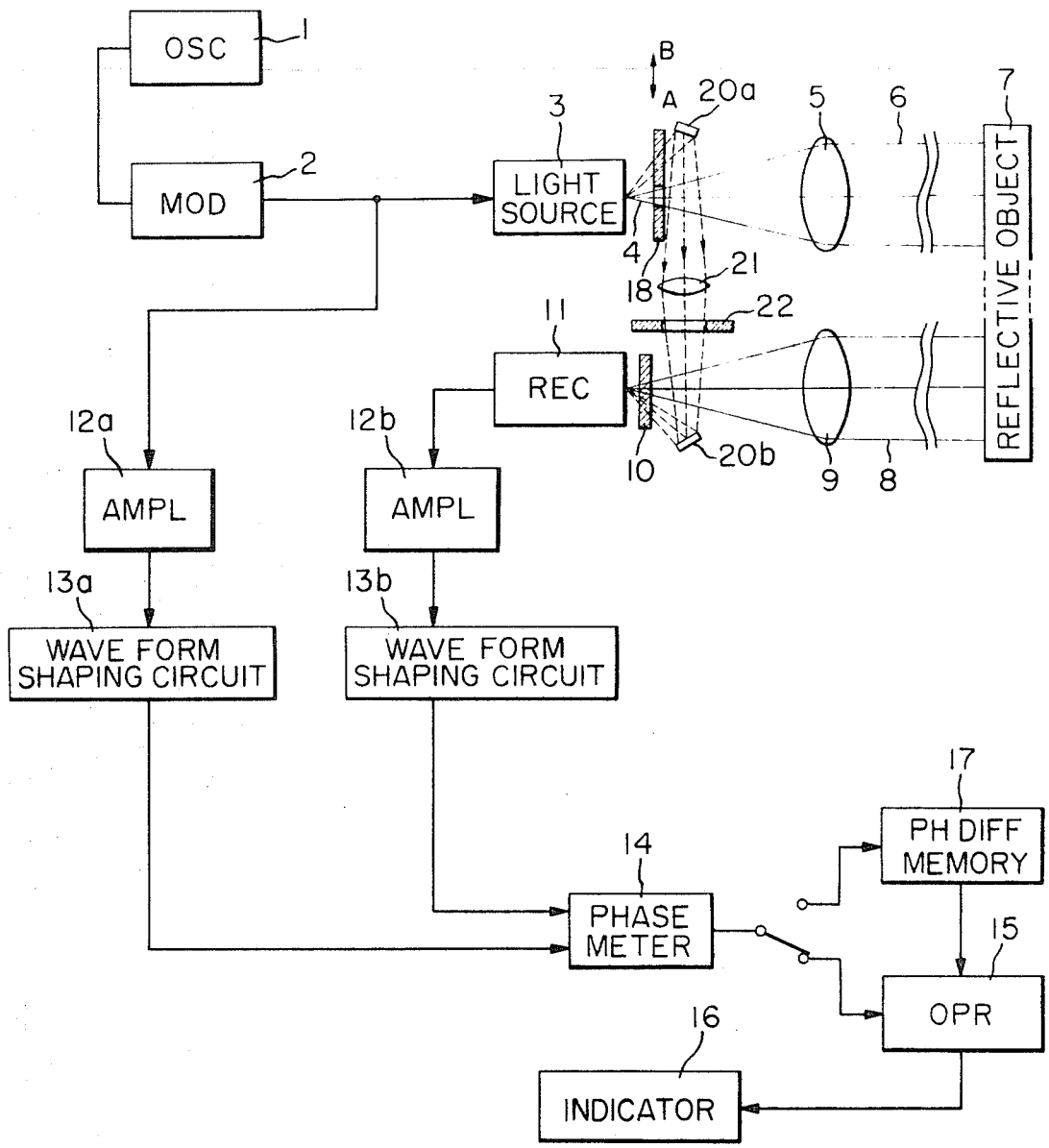
FIG. 2 is a schematic diagram of another distance measuring device according to the prior art.

Referring to FIG. 2, there is shown another example of the prior art device in which the parts designated by numerals 1 to 16 are similar to those shown in FIG. 1. An optical path changer 18 is provided between the light source 3 and the optical transmission system 5 and it is movable by unshown mechanical lever in opposite directions as indicated by double-pointed arrow A-B. When moved in the direction A to assume the shown position, the optical path changer 18 directs the light rays from the light source 3 to the optical transmission system 5. When moved in the direction B, the optical path changer 18 directs the light from the light source 3 to a mirror or reflector 20a. A condenser lens 21 is provided to condense the light rays reflected by the mirror 20a. The light thus condensed passes through a diaphragm 22 to a mirror or reflector 20b, where the light is reflected to pass through filter 10 to receiver 11. Mirror 20a, lens 21, diaphragm 22, mirror 20b, filter 10 and receiver 11 together constitute an optical system for reference waves.

In this conventional device, there are further provided a phase difference memory 17 and a switch S1, the former being arranged between the phase meter 14 and the operating circuit 15 and via the switch S1 by which the output signal of the phase meter 14 is switched over to be transmitted to the operating circuit 15 directly or through the memory 17.

In operation, the optical path changer 18 is first moved in the direction B so that the light from the light source 3 travels via mirror 20a, lens 21, diaphragm 22, mirror 20b, filter 10 to reach receiver 11. The quantity of light incident on the receiver is determined by the aperture in the diaphragm 22. The light thus received by the receiver is converted into a reference signal which is an electrical signal and transmitted to the phase meter 14 through amplifier 12b and waveform shaping circuit 13b. On the other hand, the standard signal divided from the modulator 2 passes through amplifier 12a and waveform shaping circuit 13a into phase meter 14, which measures the phase difference $\phi_B$ between the standard signal and the reference signal. Through change-over switch S1 which is then in the other closed position than shown, the phase difference $\phi_B$ thus obtained is applied to a phase difference memory 17 for storage therein.

When the optical path changer 18 is then moved in the direction A to assume the shown position, the light 4 from the light source 3 is directed through optical transmission system 5, reflective object 7, optical reception system 9, filter 10 to receiver 11, which converts the light into a reception signal which is an electrical signal. The reception signal is passed through amplifier 12b and waveform shaping circuit 13b into phase meter 14, which measures the phase difference $\phi_A$ between the reception signal and the standard signal from the modulator 2. Through change-over switch S1 now assuming the shown position, the phase difference $\phi_A$ is delivered to the operating circuit 15, which calculates the difference between the phase difference $\phi_A$ and the phase difference $\phi_B$ now stored in the memory 17 and converts such difference into a distance. The distance thus obtained is displayed at the indicator 16.

If the length of the optical path from light source 3 through reflective object 7 to receiver 11 is $L_A$ and the length of the optical path from light source 3 through mirrors 20a–20b to receiver 11 is $L_B$, then the distance L obtained in the described manner will be expressed as $L = L_A - L_B$.

On the other hand, when the above-described phase factor is taken into account, the distance $L$ will be expressed as:

$L = (c/4\pi f)(\phi_A - \phi_B) = L_A - L_B$ where $f$ is the amplitude modulation frequency and $c$ is the velocity of light in the atmosphere.

However, in the above-described conventional device, as has been noted previously, the magnitude of the reception signal varies with the distance to be measured and this causes the accuracy of the measured phase difference between the reference and reception signal to be reduced due to the non-linear characteristic of the amplifiers and waveform shaping circuits.

Figure 3:
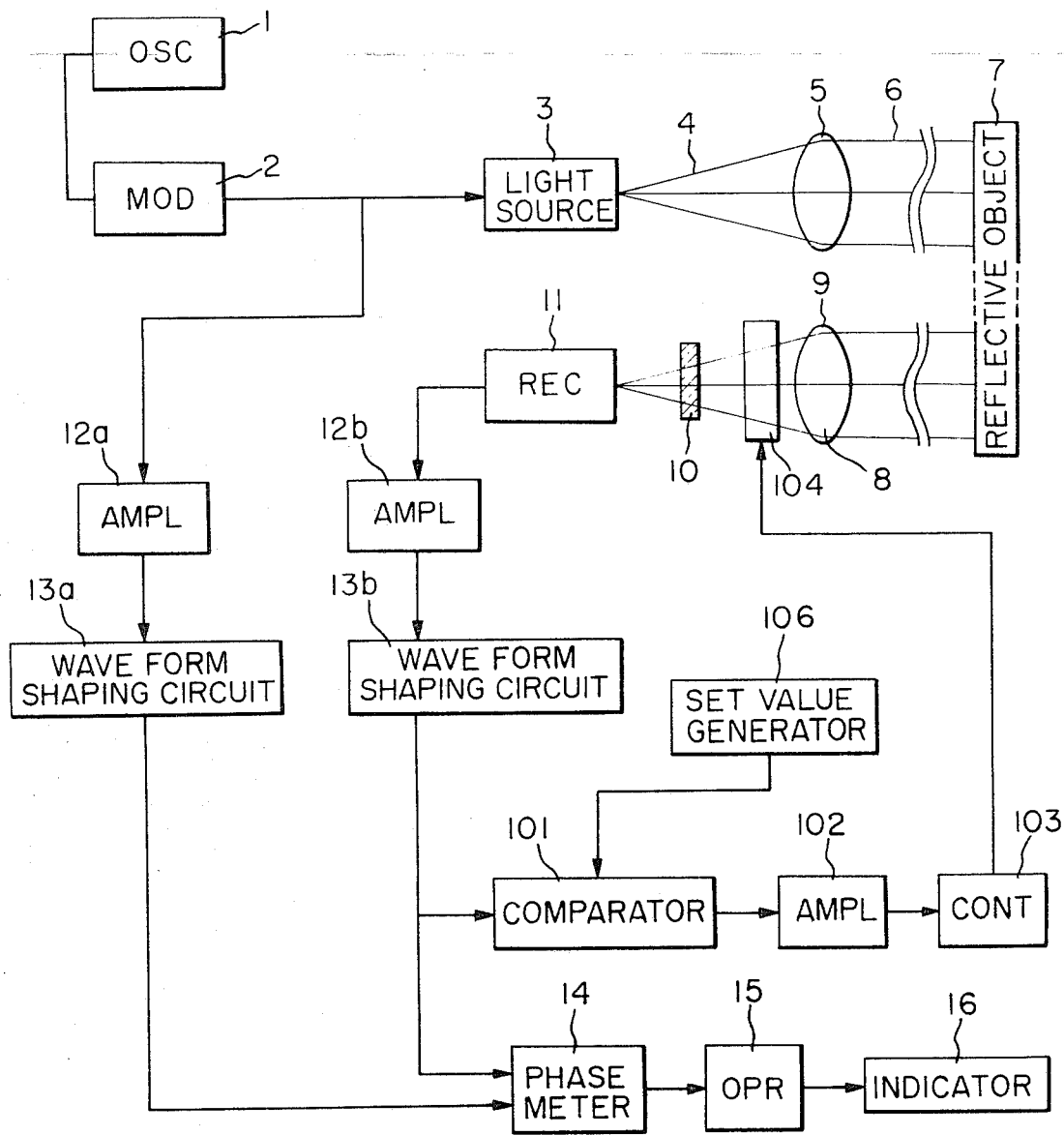
FIG. 3 is a schematic diagram of a first embodiment of the present invention as applied to the device shown in FIG. 1.

Referring to FIG. 3, there is shown a first embodiment of the present invention which has improved the prior art device of FIG. 1. It should first be noted that this inventive arrangement includes a set value generator 106 for producing a signal of a preset magnitude, and a comparator 101 which derives inputs both from the output of the waveform shaping circuit 13b and from the output of the set value generator 106 and compares the magnitudes of the two outputs. An amplifier 102 is further provided to amplify the output from the comparator 101. In accordance with the amplified signal from the comparator 101, a controller 103 controls a light quantity regulator 104, such as an electrically controlled iris diaphragm, disposed in the optical path between the optical reception system 9 and the receiver 11. The light quantity regulator 104 regulates the quantity of light to enter the receiver 101.

Thus, the light from the source 3 is reflected by a reflective object 7 and passed through light quantity regulator 104 and filter 10 to receiver 11, where it is converted into a reception signal. This signal is passed through amplifier 12b and waveform shaping circuit 13b into comparator 101, where the magnitude of the signal is compared with that of a set value signal from the set value generator 106. The result of such comparison, i.e. the difference in magnitude between the set value signal and the reception signal is then amplified by the amplifier 102 and passed to the controller 103, which controls the light quantity regulator 104 so as to regulate the quantity of light entering the receiver 11 so that the difference in magnitude between the set value signal and the reception signal may be zero or within a predetermined range. There is thus provided a reception signal whose magnitude has been varied in accordance with the regulated quantity of light entering the receiver 11. Such regulated reception signal and the standard signal from the modulator 2 are both delivered to the phase meter 14, where the phase difference between the two signals is measured and the phase difference thus obtained is converted into a distance signal by the operating circuit 15 and displayed by the indicator 16.

Although the light quantity regulator 104 has been shown as disposed between the optical reception system 9 and the receiver 11, it will readily be apparent that such regulator may be disposed between the light source 3 and the optical transmission system 5 to achieve the same result as described above.

Figure 4:
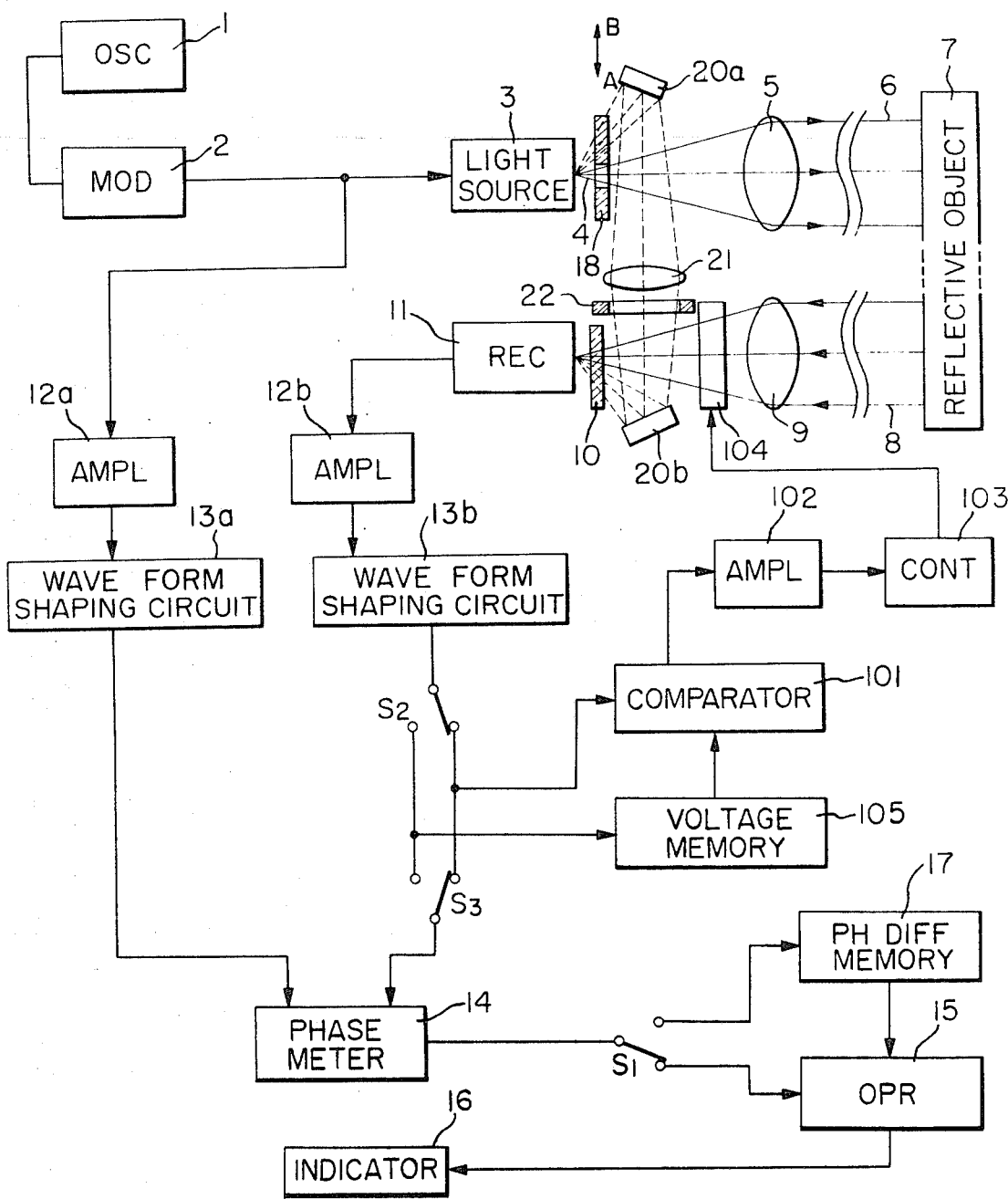
FIG. 4 is a schematic diagram of a second embodiment of the present invention as applied to the device shown in FIG. 2.

FIG. 4 shows a second embodiment of the present invention which has improved the prior art device shown in FIG. 2. This embodiment includes a light quantity regulator 104 disposed in the optical path between the optical reception system 9 and the receiver 11, a voltage memory 105 for storing the output signal from the waveform shaping circuit 13b, a comparator 101 for comparing the magnitude of the output signal from the shaping circuit 13b and the magnitude of the output signal from the voltage memory 105, an amplifier 102 for amplifying the output of the comparator 101, a controller 103 for controlling the light quantity regulator 104 in accordance with the signal from the amplifier 102, and change-over switches S1, S2 and S3 for each circuit.

In operation, when the optical path changer 18 is moved in the direction B and the change-over switches S1, S2, S3 are changed over to their respective other closed positions than shown, the light rays from the light source 3 are passed via mirror 20a, condenser lens 21, diaphragm 22, a mirror 20b, filter 10 to receiver 11, where the light is converted into a reference signal. Such reference signal is delivered through switches S2 and S3 to the phase meter 14, which measures the phase difference $\phi_B$ between the reference signal and the standard signal from the modulator 2. The phase difference $\phi_B$ is delivered through the switch S1 to the phase difference memory 17 for storage therein. On the other hand, the said reference signal is divided by the waveform shaping circuit 13b and partly delivered to the voltage memory 105 for storing the magnitude of said reference signal.

When the optical path changer 18 is then moved in the direction A to assume the shown position and the switch S2 is returned to the shown position, the light from the source 3 is reflected by the reflective object 7 and then passed through the light quantity regulator 104 and filter 10 to the receiver 11, where the light is converted into a reception signal. The reception signal is applied through switch S2 to comparator 101, where the magnitude of said reception signal is compared with that of the reference signal stored in the voltage memory 105, and a differential signal resulting from such comparison is delivered to the controller 103, which thus controls the light quantity regulator 104. If the magnitude of the reception signal is smaller than that of the reference signal, the light quantity regulator 104 will be so controlled as to increase the quantity of light to enter the receiver 11. If the magnitude of the reception signal is greater than that of the reference signal, the regulator 104 will be so controlled as to decrease the quantity of light applied to the receiver. Thus, the difference in magnitude between the reference signal and the reception signal may be zero or within a predetermined range. When switches S1 and S3 are returned to their shown positions after such regulation of the quantity of light, the regulated reception signal is passed through switches S2 and S3 to phase meter 14, which measures the phase difference $\phi_A$ between the regulated reception signal and the standard signal from the modulator 2. The phase difference $\phi_A$ is delivered through switch S1 to operating circuit 15, which calculates the difference between the phase difference $\phi_A$ and the phase difference $\phi_B$ stored in the phase memory 17 and converts such difference into a distance signal. The distance signal thus obtained is displayed by the indicator 16.

It will readily be apparent that the light quantity regulator 104 may alternatively be disposed between the light source 3 and the optical transmission system 5 to obtain the same result.

Figure 5:
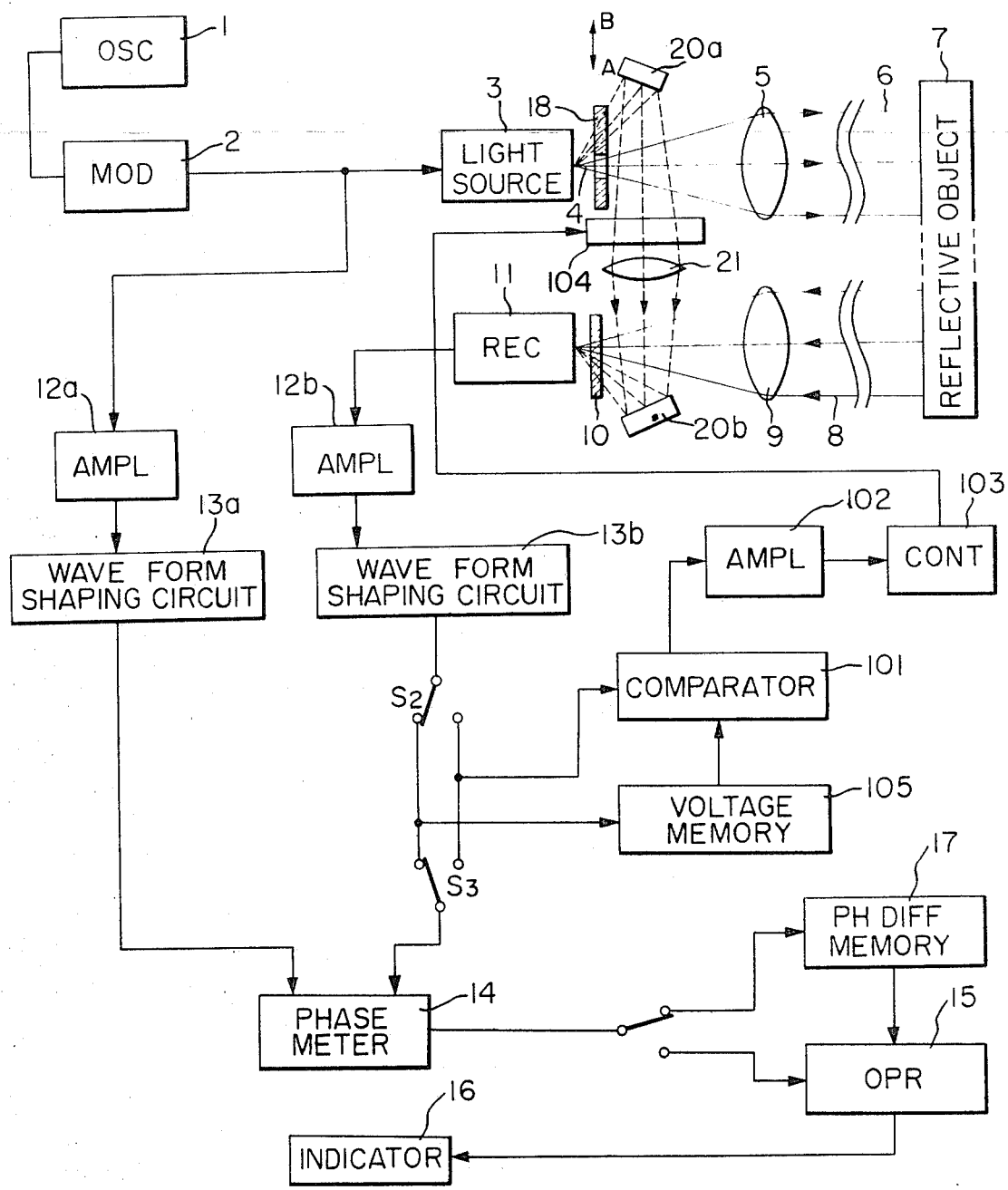
FIG. 5 is a diagram similar to FIG. 4, showing a third embodiment of the present invention.

Referring now to FIG. 5, there is shown a third embodiment of the present invention which is an improvement over the prior art device of FIG. 2. In this alternative embodiment, the light quantity regulator 104 is disposed between mirror 20a and condenser lens 21 for regulating the quantity of light to pass through an optical reference system. Accordingly, when the optical path changer 18 and change-over switches S1, S2, S3 are all brought into their respective shown positions, the light from light source 3 is reflected by a reflective object 7 and passed to receiver 11, where the light is converted into a reception signal. The reception signal is delivered to voltage memory 105 and to phase meter 14. The phase meter 14 measures the phase difference $\phi_A$ between the reception signal and the standard signal from modulator 2, and such phase difference $\phi_A$ is stored in phase difference memory 17. When the optical path changer 18 is moved in the direction B and the switch S2 is changed over to the other position than shown, the light from light source 3 passes via mirror 20a, light quantity regulator 104, mirror 20b, filter 10 to receiver 11, where the light is converted into a reference signal. This reference signal is delivered to comparator 101 which compares the magnitude of the reference signal and that of the reception signal stored in voltage memory 105. In accordance with the result of such comparison, the light quantity regulator 104 regulates the quantity of light to pass therethrough so that difference in magnitude between the reference signal and the reception signal may be zero or within a predetermined range. After such regulation, switches S1 and S3 are changed over to the other closed position than shown to pass the regulated reference signal to phase meter 14, which measures the phase difference $\phi_B$ between the regulated reference and the standard signal. This phase difference $\phi_B$ is delivered to the operating circuit 15, which thus calculates the difference between the phase difference $\phi_B$ and the phase difference $\phi_A$ stored in the phase difference memory 17 and converts it into a distance signal. The distance signal thus obtained is indicated at the indicator 16.

Figure 6:
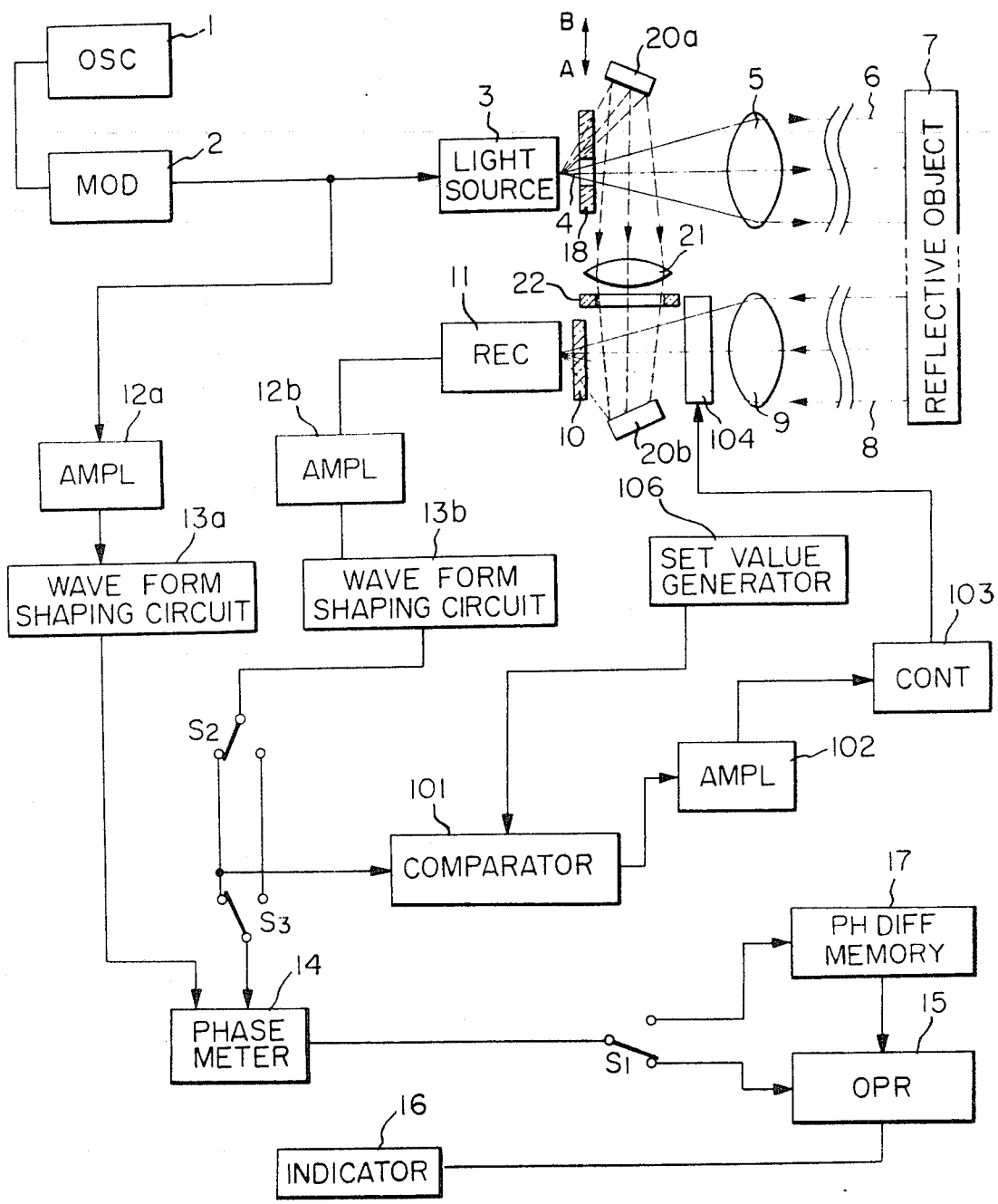
FIG. 6 is a diagram similar to FIG. 4, showing a fourth embodiment of the present invention.

FIG. 6 shows a fourth embodiment of the present invention which is also an improvement over the conventional device of FIG. 2. Set value generator 106 for producing a signal of a preset magnitude approximate to the magnitude of the reference signal is connected with comparator 101. Light quantity regulator 104 is disposed in the optical path between receiver 11 and optical receiving system 9 so as to regulate the quantity of light to pass from the reflective object to the receiver.

In operation, when the optical pass changer 18 is moved in the direction B and the change-over switches S1, S2 and S3 are changed over to the other closed positions than shown, the light rays from light source 3 are passed through optical reference system to receiver 11, which converts the light into a reference signal. The phase difference $\phi_B$ between the reference signal and the standard signal from modulator 2 is measured by phase meter 14 and stored in phase difference memory 17. When the optical path changer 18 is then moved in the direction A to assume the shown position and the switch S2 is changed over to its shown position, the light from light source 3 is reflected by the reflective object 7 and passed through light quantity regulator 104 and filter 10 to receiver 11, where the light is converted into a reception signal. The reception signal is delivered to the comparator 101, which compares the magnitude of the reception signal and that of the signal from set value generator 106. In accordance with the result of such comparison, the light quantity regulator 104 regulates the quantity of light to enter the receiver from the reflective object so that the difference in magnitude between the reception signal and the set value signal may be zero or within a predetermined range. Thereafter, switches S1 and S3 are changed over to their shown positions to pass the regulated reception signal to the phase meter, which measures the phase difference $\phi_A$ between the regulated reception signal and the standard signal. Operating circuit 15 calculates the difference between the measured phase difference $\phi_A$ and the phase difference $\phi_B$ stored in the phase difference memory and converts it into a distance signal. The distance signal thus obtained is displayed by the indicator 16.

In the embodiments of FIGS. 4, 5 and 6, the optical reference system has been shown as comprising two mirrors and a condenser lens, but such reference system may be replaced by a system for directly passing all or part of the light from the light source to the receiver.

As has been discussed above, according to the present invention, either the magnitude of the reception signal or the difference in magnitude between the reception signal and the reference signal can be confined within a predetermined range and this leads to a greater ease to design the various circuits and to an enhanced accuracy of measurement. Also, the linearity of the circuits can be made narrower to some extent, which is useful to simplify the circuits.

In addition, the problem in the prior art that a reflective object at a short distance reflects such a great amount of light as would deteriorate the receiver can be solved by the light quantity regulator which may be disposed in the optical path from the light source via the reflective object to the receiver so as to regulate the quantity of light to enter the receiver.

We claim:

1. A distance measuring device comprising:
   a source of amplitude-modulated light, wherein a light beam produced from said source is modulated at predetermined modulation frequency;
   a light receiver for converting said light beam incident thereon into an electrical signal having a magnitude corresponding to the intensity of said incident light beam;
   a reception optical system for directing said light beam from said source to a reflective object spaced from said course at a distance to be measured, and for directing the light beam reflected from said object to said receiver, wherein said receiver converts said light beam passing through said reception optical system into a reception electrical signal;
   a reference optical system having a predetermined optical path and operable to direct said light beam from said source through said predetermined optical path to said receiver, wherein said receiver converts said light beam passing through said reference optical system into a reference electrical signal;
   change-over means for selectively passing said light beam through said reception and reference optical systems one at a time;
   phase difference measuring means for measuring the phase difference between said reception electrical signal and said reference electrical signal to determine the distance to be measured;
   comparison means connected to said receiver for comparing the magnitudes of said reception and reference electrical signals and including memory means connected to said receiver for storing the magnitude of the electrical signal corresponding to the light beam passing through the other of said two optical systems while said change-over means selectively prevents the light beam passing through said one of said optical systems from entering said receiver, and a comparator connected to said receiver and said memory means for comparing the magnitude of the electrical signal corresponding to the light beam passing through said one of said optical systems with the said magnitude stored in the memory means while said change-over means prevents the light beam passing through said optical system from entering said receiver, wherein said comparator provides said output of said comparison means; and
   a light quantity regulator responsive to an output of said comparison means and disposed in one of said reception and reference optical systems for regulating the quantity of light entering said receiver through one of said optical systems so that the magnitude difference between said signals is within a predetermined range.

2. A distance measuring device according to claim 1, wherein said one optical system is said reception optical system.

3. A distance measuring device according to claim 2, wherein said source includes a modulator for providing said amplitude-modulated light, and said phase difference measuring means includes a phase meter connected to said modulator and said receiver for measuring a first phase difference between a standard signal produced from said modulator and said reception electrical signal, and for measuring a second phase difference between said standard signal and said reference electrical signal; and further comprising phase difference memory means connected to said phase meter for storing said second phase difference, and operating circuit means connected to said phase difference memory means and said phase meter for computing the phase difference between the reception and reference signals from both said first phase difference from said phase meter and said second phase difference from said phase difference memory means to determine the distance to be measured.

4. A distance measuring device according to claim 3, wherein said phase difference memory means stores the second phase difference while said change-over means selectively prevents the light beam passing through said reception optical system from entering said receiver, and wherein said operating circuit means is actuated while said change-over means prevents the light beams passing through said reference optical system from entering said receiver.

5. A distance measuring device according to claim 1, wherein said one of said two optical system is said reference optical system.

6. A distance measuring device according to claim 5, wherein said source includes a modulator for providing said amplitude-modulated light, and said phase difference measuring means includes a phase meter connected to said modulator and said receiver for measuring a first phase difference between a standard signal produced from said modulator and said reception electrical signal, and for measuring a second phase difference between said standard signal and said reference electrical signal; and further comprising phase difference memory means connected to said phase meter for storing said first phase difference, and operating circuit means connected to said phase difference memory means and said phase meter for computing the phase difference between the reception and reference signals from both said first phase difference from said phase difference memory means and said second phase difference from said phase meter to determine the distance to be measured.

7. A distance measuring device according to claim 6, wherein said phase difference memory means stores the first phase difference while said change-over means selectively prevents the light beam passing through said reference optical system from reaching said receiver, and wherein said operating circuit means is actuated while said change-over means prevents the light beam passing through said reception optical system from reaching said receiver.

8. A distance measuring device comprising:
a source of light including a modulator for producing amplitude-modulated light, wherein a light beam produced from said source is modulated at a predetermined modulation frequency;
a light receiver for converting said light beam incident thereon into an electrical signal having a magnitude corresponding to the intensity of said incident light beam;
a reception optical system for directing said light beam from said source to a reflective object spaced from said source at a distance to be measured, and for directing the light beam reflected from said object to said receiver, wherein said receiver converts said light beam passing through said reception optical system into a reception electrical signal;
a reference optical system having a predetermined optical path and being operable to direct the light beam from said source through said predetermined optical path to said receiver, wherein said receiver converts said light beam passing through said reference optical system into a reference electrical signal;
change-over means for selectively passing said light beam through said reception and reference optical systems one at a time;
phase difference measuring means including a phase meter connected to said modulator and said receiver for measuring a first phase difference between a standard signal produced from said modulator and said reception electrical signal and for measuring a second phase difference between said standard signal and said reference electrical signal;
a generator for generating a set signal having a predetermined magnitude;
comparison means connected to said receiver and said generator for comparing the magnitudes of said reception electrical signal and said set signal;
a light quantity regulator responsive to an output of said comparison means and disposed in said reception optical system for regulating the quantity of said light beam entering said receiver through said reception optical system so that the magnitude difference between said reception and reference signals may be zero or a predetermined range;
phase difference memory means connected to said phase meter for storing said second phase difference; and
operating circuit means connected to said phase difference memory means and said phase meter for computing the phase difference between the reception and reference signals from both said first phase difference from said receiver and said second phase difference from said phase difference memory means to determine the distance to be measured.

* * * * *